US007676841B2

(12) United States Patent
Sobchuk et al.

(10) Patent No.: US 7,676,841 B2
(45) Date of Patent: Mar. 9, 2010

(54) NETWORK INTRUSION MITIGATION

(75) Inventors: Gregory M. Sobchuk, Hingham, MA (US); Shekhar Subramaniam, Coppell, TX (US); Khurram Zaheer, Malden, MA (US); Alexander Gelfenshteyn, Bronx, NY (US); Ramesh Shetty, Woburn, MA (US); Michael Brady, Boston, MA (US); George Donnegan, Stoughton, MA (US); Roger McGuire, Carrollton, TX (US)

(73) Assignee: FMR LLC, Boston, MA (US)

( * ) Notice: Subject to any disclaimer, the term of this patent is extended or adjusted under 35 U.S.C. 154(b) by 795 days.

(21) Appl. No.: 11/049,628

(22) Filed: Feb. 1, 2005

(65) Prior Publication Data
US 2006/0174342 A1 Aug. 3, 2006

(51) Int. Cl.
G06F 11/30 (2006.01)
(52) U.S. Cl. .......................................... 726/23; 726/24
(58) Field of Classification Search ............. 726/11–14, 726/22–24
See application file for complete search history.

(56) References Cited

U.S. PATENT DOCUMENTS

| 5,805,801 | A | * | 9/1998 | Holloway et al. | 726/22 |
| 5,905,859 | A | * | 5/1999 | Holloway et al. | 726/22 |
| 7,281,270 | B2 | * | 10/2007 | Piesco et al. | 726/25 |
| 7,418,732 | B2 | * | 8/2008 | Campbell et al. | 726/23 |
| 7,463,590 | B2 | * | 12/2008 | Mualem et al. | 370/241 |
| 2001/0034844 | A1 | * | 10/2001 | Bellovin | 713/201 |
| 2002/0166068 | A1 | * | 11/2002 | Kilgore | 713/201 |
| 2003/0084322 | A1 | * | 5/2003 | Schertz et al. | 713/200 |
| 2004/0003284 | A1 | * | 1/2004 | Campbell et al. | 713/201 |
| 2004/0093511 | A1 | * | 5/2004 | Crutcher et al. | 713/201 |
| 2005/0018618 | A1 | * | 1/2005 | Mualem et al. | 370/252 |
| 2005/0021740 | A1 | * | 1/2005 | Bar et al. | 709/224 |
| 2005/0044418 | A1 | * | 2/2005 | Miliefsky | 713/201 |
| 2005/0246767 | A1 | * | 11/2005 | Fazal et al. | 726/11 |
| 2005/0278784 | A1 | * | 12/2005 | Gupta et al. | 726/23 |

* cited by examiner

Primary Examiner—Christian LaForgia
(74) Attorney, Agent, or Firm—Proskauer Rose LLP

(57) ABSTRACT

Described are methods and apparatus, including computer program products, for mitigating against a cyber attack on a network. An indication is received from an intrusion detection system that an event has occurred representing a threat to the network. Upon receiving the event from the intrusion detection system, automated processes determine a port associated with the threat and automatically block the port.

30 Claims, 15 Drawing Sheets

500 https://camccddal1:12805/cam_v1/popup5checks.jsp?reactsubmit=Reac...

☐ 1. Virus Removed - Using the appropriate automated tool and/or the required manual process, be sure that the virus has been removed from the infected computer.
☐ 2. Patches Installed - If required, apply the appropriate patch (es) to the software that became infected. Patches can be found at http://fisc-isb.fmr.com.
☐ 3. SAV Definitions Updated - Install the most current Symantec Anti-Virus definitions.
☐ 4. Altiris Installed - Verify that the Altiris client is installed and working properly so that future patches can be applied remotely rather than manually.
☐ 5. Admin Privileges Checked - Make sure that the local administrator account on the desktop includes the DMN1\gFISCTSSDesktopTechs and DMN1\gFISCDataSecurity entries.

[Submit] [Cancel]

504

550

NETWORK INTRUSION MITIGATION

TECHNICAL FIELD

This disclosure relates to mitigation of a network intrusion such as a computer worm or other computer virus.

BACKGROUND

Companies, government, and other entities are often heavily reliant on computer networks to conduct their day-to-day operations. These computer networks are sometimes subject to a cyber attack from a malicious user (e.g., a hacker) or program (e.g., virus, worm, zombie, etc.), which can cause a significant negative impact on, for example, a company's business operations. While a company can purchase intrusion detection software that notifies the company of a cyber attack, many software products have limited ability to mitigate against such an attack.

SUMMARY

In general, in one aspect, there is a computer-implemented method for mitigating against a cyber attack on a network. The method includes receiving an indication from an intrusion detection system that an event has occurred representing a threat to the network. The method also includes determining a port associated with the threat and automatically blocking the port.

In another aspect there is a system for mitigating against a cyber attack on a network. The system includes a cyber attack mitigation application that is configured to receive an indication from an intrusion detection system that an event has occurred representing a threat to the network, determine a port associated with the threat, and automatically block the port.

In another aspect, there is a computer program product, tangibly embodied in an information carrier, for mitigating against a cyber attack on a network. The computer program product including instructions being operable to cause data processing apparatus to receive an indication from an intrusion detection system that an event has occurred representing a threat to the network, determine a port associated with the threat, and automatically block the port.

Other examples of any of the aspects can include one or more of the following features. A logical address of a network device associated with the event can be received. The logical address can include an IP address. A physical address of the network device can be identified using the logical address. The physical address can include a media access control address. The network can be prevented from assigning another logical address to any device having the identified physical address. Dynamic host configuration protocol (DHCP) can be employed to prevent the network from assigning another logical address to any device having the identified physical address. The network device can be prevented from reconnecting to the network.

Routing tables maintained by routers in the network can be queried to identify a physical router port to which a network device associated with the event is connected. Tables maintained by switches connected to the identified physical router port can be queried to identify a physical switch port to which the network device is connected. An extended access control list can be employed for automatically blocking a port. The extended access control list can be applied to one or more routers associated with a region selected by a user to automatically block. A logical grouping of interfaces associated with a segment of the network can be determined. Each physical port associated with a device included in the logical grouping can be blocked.

One or more routers of the network can be periodically queried to build a list of active interfaces on each router or the logical ports corresponding to each active interface. An electronic notification of the received event can be automatically transmitted to a predefined list of users. A frequency of notification can be automatically changed when a predefined number of events are received within a predefined period of time. The port can be re-enabled after a device associated with the threat has been cleaned.

The application can include a port management module configured to query one or more network devices of the network to determine a physical port associated with the threat. The application can include a filtering module configured to automatically block a protocol port. The application can include a segmentation module configured to automatically block a plurality of ports associated with a logical segment of the network. The logical segment of the network comprises a segment associated with enterprise functionality. The logical segment of the network can include a segment associated with production, testing, or general computing.

Implementations can realize one or more of the following advantages. The cyber attack mitigation application, upon receiving a detected event from an IDS, automatically queries the network and detects the port associated with the threat and shuts off that port, with no human intervention. Logical segments of the network can be created so that only particular portions of the network can be shut down. For example, if threats are detected mostly in the general computing population, the production and testing segments of the network can advantageously be left operational while the general computing segment is blocked. The techniques allow the configuration ability for blocking specific data types associated with a threat. For example, if the threat existed for SMTP traffic, that data type could be blocked so that other data, even from an infected device, can still be allowed to advantageously maximize the use of the network while simultaneously preventing the threat from spreading across the network.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A-5K are screen shots of a graphical user interface for a cyber attack mitigation control center application.

DETAILED DESCRIPTION

Figure 1:
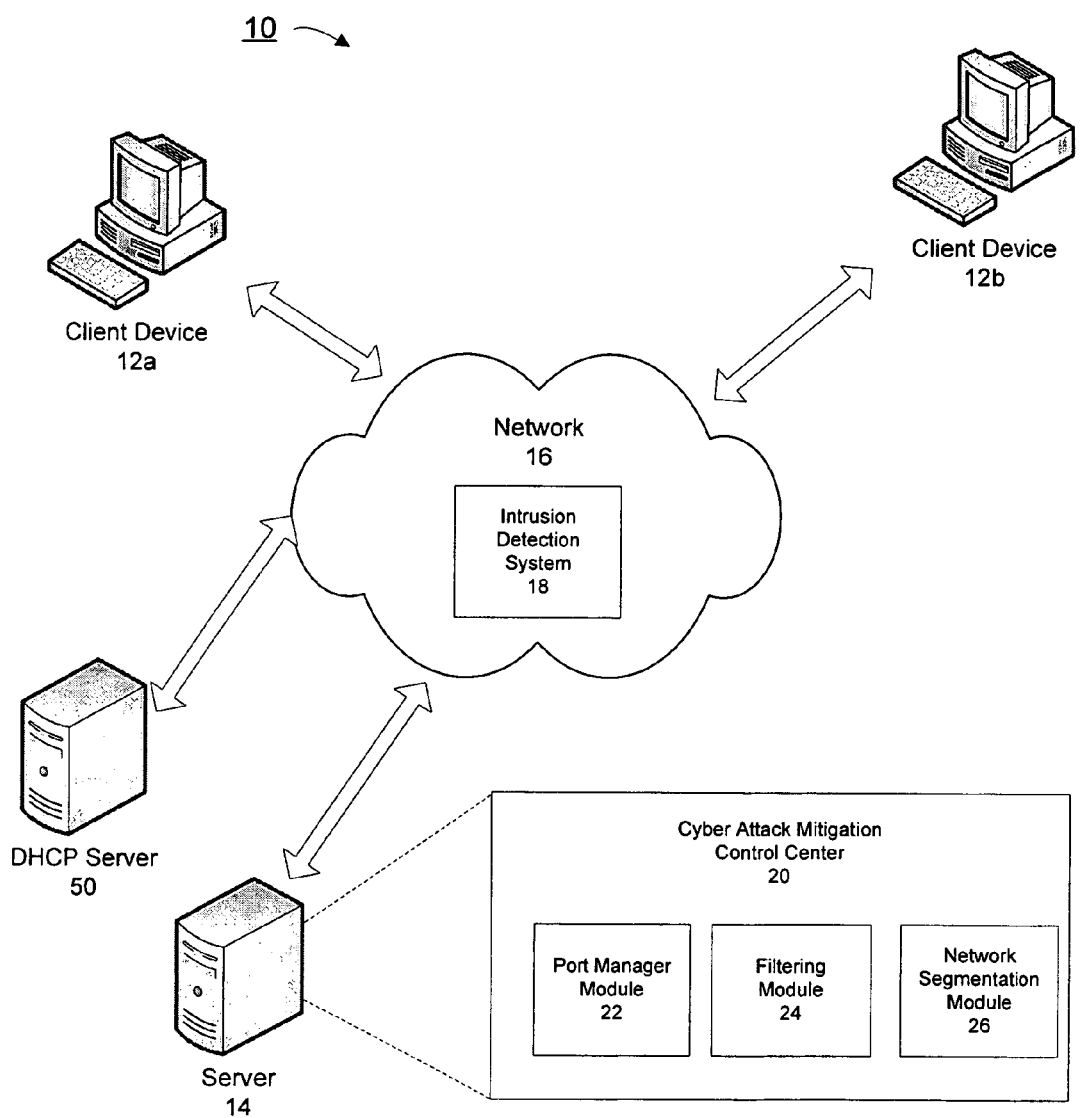
FIG. 1 is a diagram of a network.

Referring to FIG. 1, a computer system 10 associated with a company includes client computers 12a, 12b in communication with a server 14 using a network 16. The network 16 includes an intrusion detection system (IDS) 18, which monitors data packets traveling through the network 16 to discover if the network 16 is under attack from, for example, a worm, a virus, or other computer threat. The intrusion detection system 18 may be any known intrusion detection system (IDS) such as an intrusion detection system RealSecure Network by Internet Security Systems, Inc.

Server 14 includes a Cyber Attack Mitigation Control Center (CAM CC) application 20, which mitigates against a cyber attack detected by the intrusion detection system 18. The CAM CC 20 includes three primary modules; a port manager module 22, a filtering module 24, and a network segmentation module 26. The three modules 22, 24, and 26 mitigate the spread of cyber attacks using different techniques. Some techniques perform blocking using a physical port (e.g., the physical port number on a LAN switch). Other techniques perform blocking using a logical port (e.g., all devices associated with one or more particular virtual local area networks (VLAN), such as VLAN no. 16). Yet other techniques perform blocking using protocol ports (e.g., SMTP port 25 for TCP or DNS port 53 for UDP). Unless indicated otherwise, the use of the term "port" herein refers broadly to any of these types of ports (e.g., physical, logical, protocol, and the like).

The port manager module 22 functions to automatically determine and deactivate the physical port to which an infected device is connected. The port manager module 22 also determines the media access control (MAC) address of the infected device and prevents the device from re-accessing the network 18 until the device can be cleaned. Thus, for example, if the intrusion detection system 18 detects that a device at Internet Protocol (IP) address 100.101.102.103 is infected with an Internet worm, the port manager module 22 searches the network 16 to identify the physical port of the switch to which the device is connected and shuts down the identified port. In addition, the port manager module 22 obtains the MAC address of the infected device and provides the MAC address to the network's dynamic host configuration protocol (DHCP) server(s) 50, which allocate IP addresses to devices connecting to the network, to prevent the device from obtaining a different IP address and reconnecting to the network.

The filtering module 24 and the network segmentation module 26 permit a user, such as a network administrator, to shut down portions of the network 16 during a cyber attack. The filtering module 24 allows a user to shut down (or filter) particular protocol ports during a cyber attack. For example, in TCP, ports 20 and 21 are defined for FTP data and control, respectively, port 25 is defined for SMTP, etc. A network administrator may use the filtering module 24 to block a particular protocol port (e.g., SMTP port 25), stopping any traffic on that port, while keeping other protocol ports open. The filtering module 24 also allows the filter to be applied to a particular geographical region of the network 16. The network segmentation module 26 allows a user to shut down particular logical or geographical regions of the network that have been defined as a logical segment. For example, the network 16 may be logically divided into a number of virtual local area networks (VLANs) according to enterprise functionality segments (also referred to as zones), with one segment associated with general computing devices (e.g., employee desktop and laptop computers) and another group associated with production devices (e.g., a device containing a database holding customer data records). In the event of a cyber attack that is being propagated through general computing devices, a network administrator may choose to exclude the VLANS associated with the general computing devices from the network 16. Similarly, if a cyber attack occurs in a particular geographical area of the network 16, such as a particular city or within a particular building, a network administrator may choose to exclude the infected city or building from the remainder of the network. The segmentation module 26 maps the selected segmented area to physical ports that are blocked.

Figure 2:
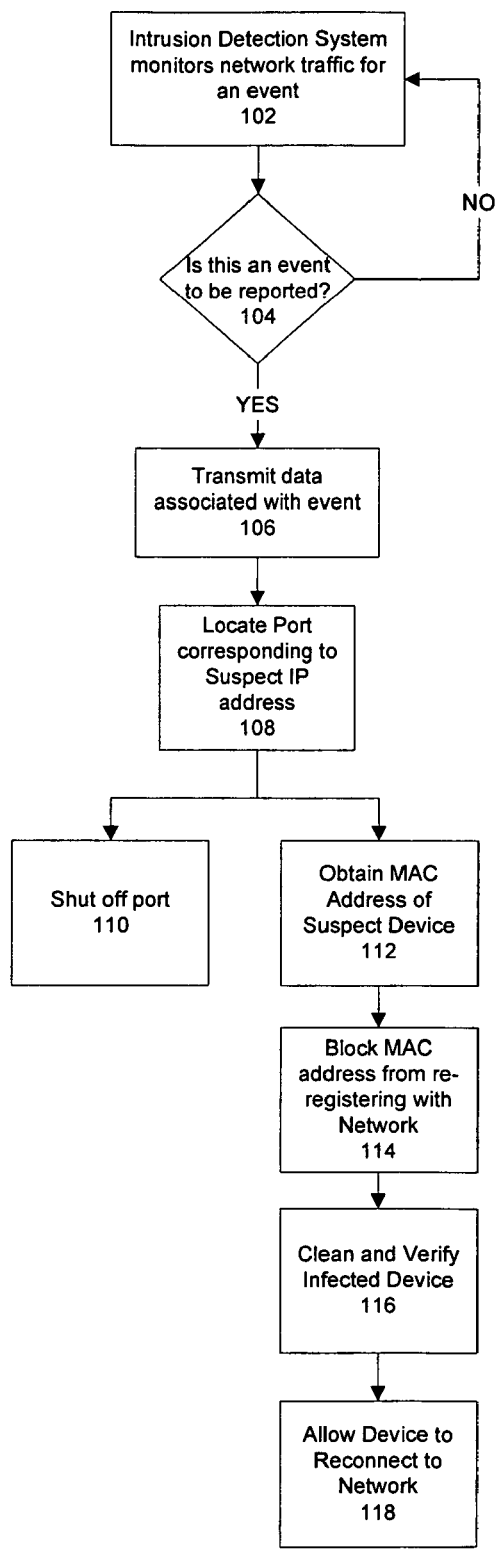
FIG. 2 is a flow chart of a process for automatically mitigating against a cyber attack.

FIG. 2 illustrates a process 100 that prevents mitigation of a detected threat on the network 16. In process 100, the intrusion detection system 18 monitors (102) network traffic for events (e.g., the detection of a predefined signature) that the IDS 18 has been configured to detect. If the intrusion detection system 18 detects an event, the IDS 18 determines (104) whether the event is one that is to be reported to the CAM CC application 20. If the detected event is not one for which the IDS 18 notifies the CAM CC application 20, the IDS 18 monitors (102) network traffic for detection of another event. If the detected event is an event for which the IDS 18 notifies the CAM CC application 20, the IDS 18 transmits (106) data associated with the event. The data can include, for example, the IP addresses of the infected computing device, the signature name or ID of the signature that was detected and triggered the event, and the like.

Upon receiving the event and associated data, the CAM CC application 20 passes this data to its port manager module 22. If the port manager module 22 is in an active state, the port manager module 22 locates (108) the physical port to which the device associated with the suspect IP address is connected. Upon locating the physical port, the port manager module 22 shuts off (110) all traffic flow using that port. In some implementations, the port manager module 22 locates the port by querying routers and switches in the network 16 for information about the suspect IP address. Each router maintains a routing table, which maps IP addresses to the physical ports of the router. By querying these routing tables, the port manager module 22 can locate (108) the port to which an infected device is connected to the network 16 and shut off (110) the port.

In general overview, the locating (108) of the port occurs by querying a gateway router and then hopping on to the connected switch, and then querying the next connected switch using the CAM table (similar to routing table, but contains MAC mappings). For example, the CAM CC application 20 logs on to the gateway (in most networks this is the 0.1, 0.2, 0.3, or 0.4 address). On the router, the CAM CC application 20 determines the associated MAC address for a particular IP by using, for example, the following command "show ip arp 100.123.151.123", where 100.123.151.123 is the IP address associated with the host device of the detected threat. This brings back the associated MAC address for the particular IP in the following form "000b:8501:9df0". Then the CAM CC application 20 performs another query (e.g., "show CDP neighbors detail") to, find out what switches are connected to the device, and telnets to any of the connected switches. On the switch, the CAM CC application makes a request (e.g., a "show cam dynamic 00-0b-85-01-9d-f0") that returns a value indicating what port the device may be on, or may be connected off. This means that the device is either directly connected to the device on a particular port, or that port is connected to another switch that may be again connected directly to the device, or another switch. The switches maintain a CAM table (similar to routing tables on routers) to indicate what is physically connected where. When the CAM CC application 20 reaches a switch that shows the device as directly connected and does not provide reference to another switch, the CAM CC application 20 has found the interface that needs to be disabled.

Figure 3:
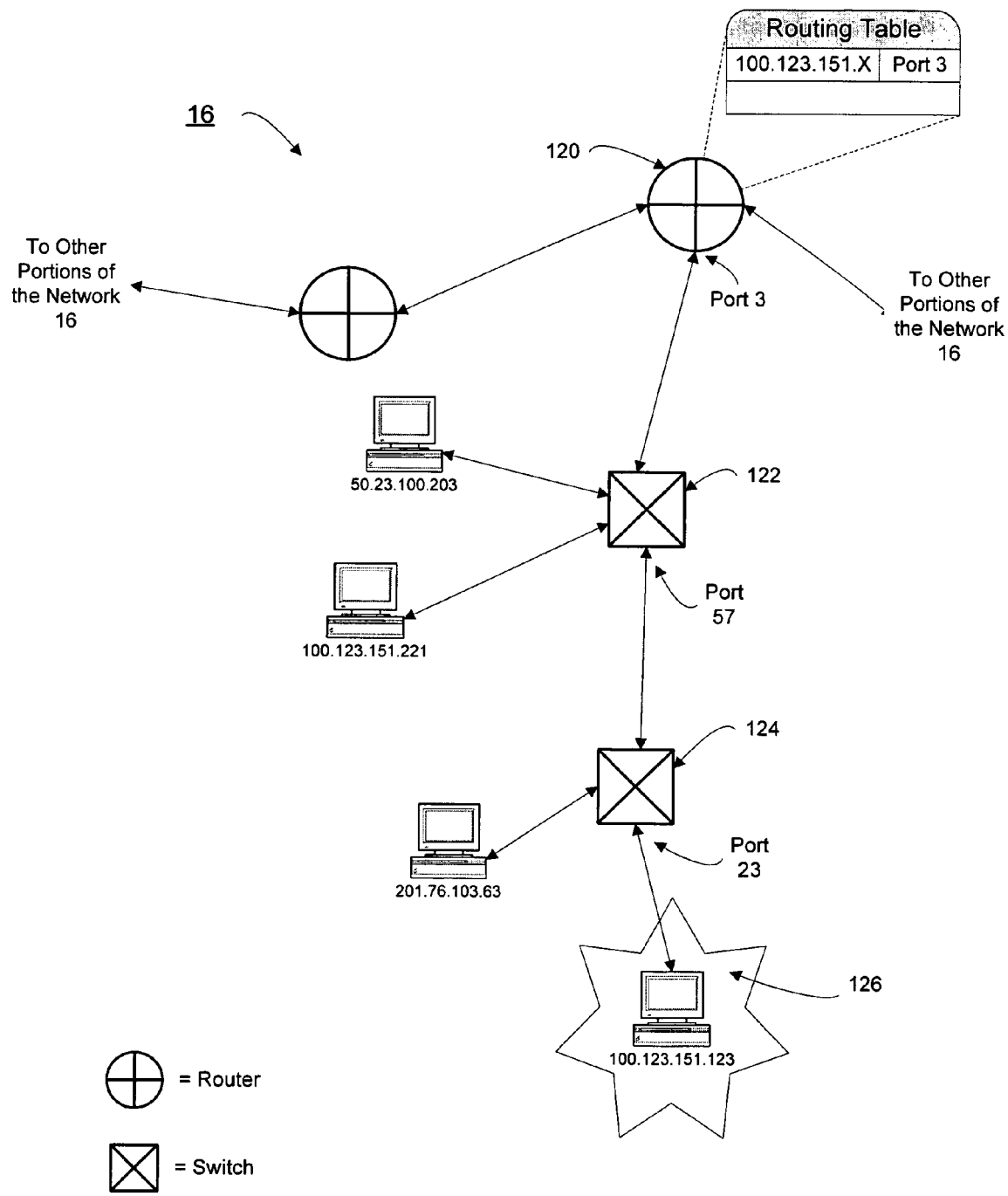
FIG. 3 is a diagram of a portion of a network.

By way of illustration, referring to FIG. 3, if an intrusion detection system (e.g., 18 in FIG. 1) detects that IP address 100.123.151.123 is a probable source of attack, the port manager module 22 transmits a query for that IP address to every router within the network 16. Router 120 shows on its routing table that the router 120 forwards packets 100.123.151.X to a switch 122 connected to port 3 of the router 120. The port manager module 22 queries the switch 122 to determine if a device having IP address 100.123.151.123 is connected to the switch 122. The switch 122, which also maintains a searchable table of addresses, reports that the switch 122 forwards packets destined for IP address 100.123.151.123 through its port 57, which is connected to another switch 124. The port manager module 22 queries the switch 124 and determines that a device 126 associated with the IP address 100.123.151.123 is connected to the network 16 at a port 23 of the switch 124. The port manager module 22 instructs switch 124 to block traffic on physical port 23 of the switch 124, which isolates the infected device 126 from the network 16.

In some implementations, the port manager module 22 locates (108) and blocks (110) ports to different suspect devices in parallel. In other words, when the port manager module 22 receives a suspect IP address from the intrusion detection system 18, the port manager immediately begins querying devices (e.g., routers, switches, etc.) on the network 16 to locate the port to which the device having the suspect IP address is connected irrespective of whether the port manager module 22 is also in the process of querying the network 16 for the port of another suspect IP address.

Referring again to FIG. 2, the port manager module 22 also obtains (112) the MAC address of the source device from the switch (e.g., the switch 124) to which the device (e.g., the device 126) is connected. Since switches operate at the MAC layer, switches maintain MAC addresses of connected devices. Once the port manager module 22 obtains the MAC address, the port manager module 22 blocks (114) the device associated with that MAC address from reconnecting to the network 16. For example, the port manager module 22 prevents the device from re-connecting to the network 16 through a different port by preventing the network's DHCP server(s) 50, which are responsible for assigning IP addresses to devices that connect to the network, from assigning a new IP address to the MAC address of the source device. Thus, a user or the infected device cannot reconnect to the network 16 (e.g., through a wireless connection or at another physical port).

After the infected device is quarantined from the network 16, the device can be cleaned (116) using standard anti-virus software and verified to ensure that the virus has been eliminated. After the infected device has been cleaned and verified, its MAC address is re-enabled on the DHCP server(s) 50 and that device is able to reconnect (118) to the network 16.

Figure 4:
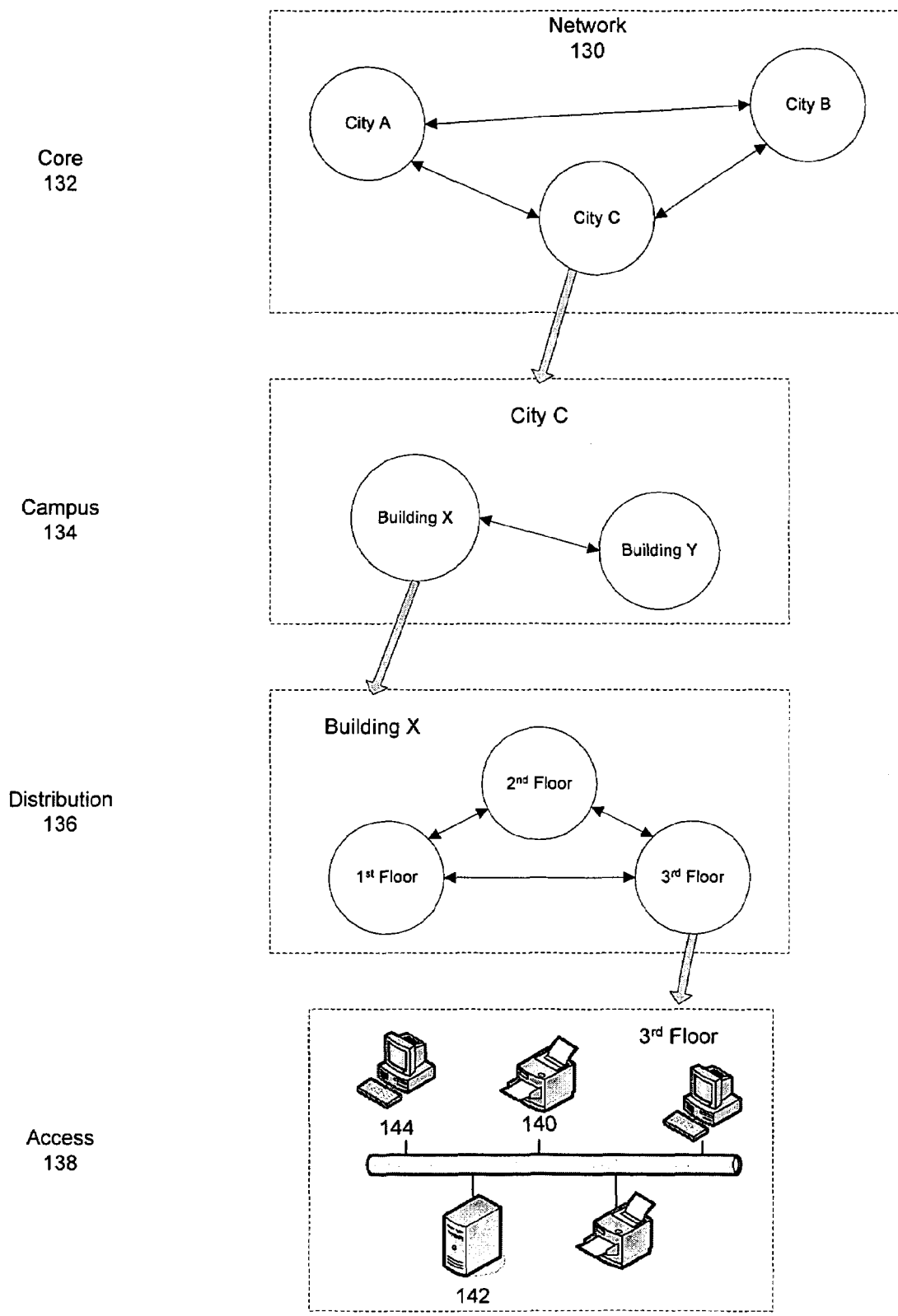
FIG. 4 is a diagram of geographical layers of a network.

As described above, the segmentation module 26 enables an administrator or other authorized user to shut off particular portions of a network according to a particular defined segmentation. FIG. 4 illustrates a network 130 with an exemplary segmentation. The network 130 is geographically divided into four layers, a core layer 132, a campus layer 134, a distribution layer 136, and an access layer 138. At the core layer 132, the network 130 is divided by city, with network devices located in city A in one group, devices located in city B in another group, and devices located in city C in a third group. Devices in cities A, B, and C are interconnected using edge routers (not shown) or other network switching/routing devices. At the campus layer 134, network devices in each city, e.g., city C, are grouped according to the building in which the devices are located, e.g., building X and building Y. Devices in building X and Y are interconnected using edge routers or other switching/routing devices. At the distribution layer 136, network devices in each building, e.g., building X, are grouped according to the floor on which the devices are located, e.g., $1^{st}$ floor, $2^{nd}$ floor, $3^{rd}$ floor. Devices on each floor are interconnected using routers and/or switches. Finally, at the access layer 138, network devices (e.g., printer 142, server 144, desktop computer 146) on each floor are separately identified. Devices at the access layer include end points and connect into a physical port of the network 130 using, for example, an Ethernet card and either wired or wireless connection technology.

In addition to geographically dividing the network into various layers as shown in FIG. 4, network devices may also be divided into logical groups. For example, network resources may logically divide its network resources into three groups based on their usage: (i) resources used for production operations, (ii) resources used in testing/laboratory operations, and (iii) general computing resources (e.g., employees' desktop computers). One way to logically divide network resources is to assign network devices belonging to a group (e.g., general computing) in to a specific range of virtual local area network (VLAN) identifiers. Continuing with the above example, a company may designate the following VLAN numbers to each of the three logical groups (sometimes referred to as zones) as illustrated in Table 1.

TABLE 1

| VLAN no. | Group |
| --- | --- |
| 16-99 | General computing |
| 200-299 | Production |
| 700-799 | Testing/Lab |

The segmentation module 26 of the CAM CC application 20 allows a network administrator or other authorized user to segregate and block geographic or logical groups of network resources from the network. Thus, for example, if infected IP addresses provided an intrusion detection system 18 indicates that a cyber attack is limited to a certain city or certain building, a network administrator or other authorized user can use the segmentation module 26 to segregate the city (e.g., the city C) or building (e.g., the building X) from the rest of the network 130. When a city or building is segmented, all network devices located within that city or building are prevented from accessing other parts of the network 130. To allow network administrators and other users responsible for combating a cyber attack to continue to access the network 130, devices associated with these users are preferably not segmented from the remainder of the network 130. Thus, edge routers touching the effected segment preferably include an access control list that permits devices associated with the network administrators or other authorized users to access the entire network. The CAM CC application 20 enables this by providing a GUI that allows a user to define exception devices that are not blocked from the network 130, even if they fall within the actual geographical segment that has been blocked.

Similarly, a network administrator or other authorized user may use the segmentation module 26 to segregate a logical group of network resources from the remainder of the network 130. For example, worm viruses are often propagated primarily through general computing resources (e.g., employees' desktop machines). Thus, if a cyber attack is detected and appears to be limited to general computing resources, a network administrator or other authorized user may segregate general computing resources from the remainder of the network, allowing production resources and testing/laboratory resources to remain connected to the network. For example, in the illustrated segmentation of Table 1, the VLAN nos. 16-99 can be blocked while allowing the other defined VLANs to remain accessible on the network. Because routers may occasionally change the physical interface corresponding to the virtual port that is to be blocked, the CAM CC application 20 dynamically maintains a list of interfaces in the network devices (e.g., access routers). For example, the CAM CC application 20 can be configured to periodically (e.g., every 8 hours) query routers (e.g., using simple network management protocol (SNMP)) to build a list of active interfaces on each router and the logical ports corresponding to each active interface. Again, to prevent network devices associated with network administrators or other authorized user from being segregated, these devices are preferably exempted from segregation.

The remaining module of the CAM CC application 20 is the filter module 24. This module 24 permits a network administrator or other user to block specific protocol ports (e.g., the HTTP port 80, for either TCP or UDP, or the HTTPS port 443, for either TCP or UDP) across all or a portion of the network. In this case, it is the data that is being restricted, not the device. This advantageously allows other data to flow through the network, while preventing the data corresponding to the cyber attack from traveling across the network and doing further damage. In some implementations, the filtering module 24 includes a one or more pre-built scripts that cause routers at the core layer, campus layer, or other segment to block one or more targeted protocol ports.

When a network administrator or other authorized user wants to block a protocol port on all or a portion of the network, he or she can use a GUI generated by the CAM CC application 20. The GUI enables the user to select a protocol (e.g., TCP and/or UDP) and one or more defined protocol ports (e.g., the SMTP port 25) the user wants to block. The GUI also enables the user to select a segment (e.g., geographical region) to which the filter will be applied. After selecting the port numbers that are to be filtered, the filter module 24 inserts the port numbers into the appropriate locations in the pre-built scripts, which are then transmitted to routers at, for example, the core or campus layer.

Figure 5A:
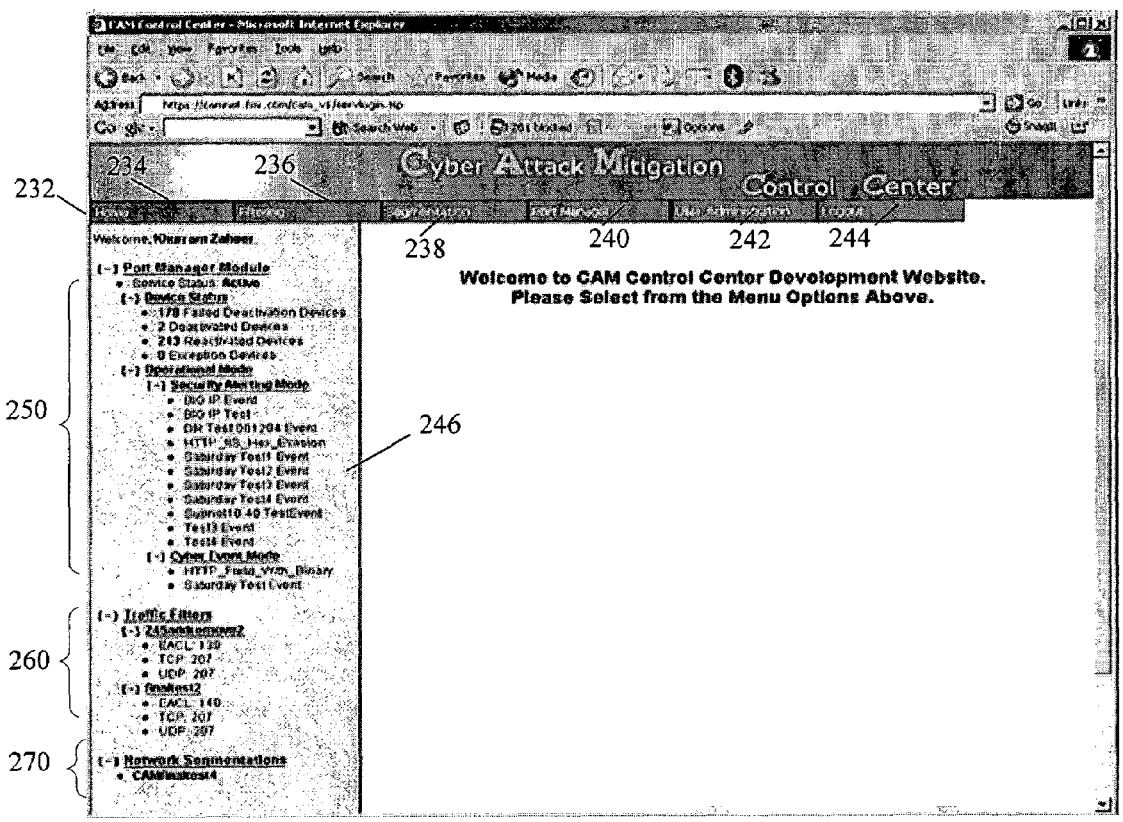

FIG. 5A illustrates a screenshot of an exemplary graphical user interface 230 generated by the CAM CC application 20. For communication with the CAM CC application across the network 16, the graphical user interface 230 can be loaded by a web browser such as the Internet Explorer® web browser by Microsoft Corporation. The interface 230 permits an authorized user to activate one or more of its attack mitigation modules (e.g., the port manager module 22, the filtering module 24, and the network segmentation module 26). The interface 230 includes a command bar 232 which includes a "Home" button 234, a "Filtering" button 236, a "Segmentation" button 238, a "Port Manager" button 240, a "User Administration" button 242, and a "Logout" button 244.

The interface 230 also includes a dashboard 246, which provides a summary of all status mitigation controls that are applied to the network 16. The dashboard 246 includes the name of the user, e.g., "Khurram Zaheer", currently logged onto the CAM CC application 20. Because the CAM CC application 20 provides a powerful tool for controlling access to a company's network, the CAM CC application 20 is limited to only specific users and requires login. In addition, the CAM CC application 20 also records the user's actions in the CAM CC application 20. Thus, for example, if a user shuts down an entire segment of the company's network, the identity of the user who took the action is recorded by the CAM CC application 20. Once a user has logged into the CAM CC application 20, he or she can logout by simply clicking the logout button 244 on the command bar 232. The CAM CC application 20 also logs a user out after some period of time of inactivity. This period of time is configurable.

In addition to showing the user name of the person logged into the CAM CC application 20, the dashboard 246 also includes a port manager module summary area 250, a filtering module summary area 260, and a network segmentation module summary area 270 that summarize the current status of the each of the three corresponding mitigation modules. The port manager module summary area 250 in the dashboard 246 includes a service status, a device status, and an operational mode of the port manager module 22. The port manager module 22 has two service statuses, active and inactive. The active status, which is the status shown in FIG. 5A, means that the port manager module 22 automatically responds to intrusion events transmitted by an intrusion detection system (e.g., intrusion detection system 18 shown in FIG. 1). An inactive status means that the port manager module 22 does not automatically respond to such intrusion events, but rather a user manually initiates action using the port manager module 22.

To change the service status, the user can select the port manager button 240. Upon selection of or moving the cursor over the button 240, a menu appears with additional selections associated with the port manager module 22, such as service manager, manage devices, device search, and reports. Selection of or moving the cursor over the service manager menu entry causes an additional menu to appear on the side of the service manager menu entry. The additional menu includes, for example, selections such as start/stop service and notification manager.

Selection of start/stop service causes a dialog box to be generated with two buttons in the box. There is a start button and a stop button. Selection of the start button changes the state to active, which means that the port manager module 22 is active and automatically detects and shuts down the physical port associated with an infected host device identified in a received event. Selection of the stop button changes the state to inactive, which means that the port manager module 22 is inactive and does not automatically react to an event received from an IDS.

Selection of notification manager causes a dialog box to be generated with two hyperlinks in the box. There is a cyber event mode hyperlink and a security alerting mode hyperlink. Selection of either hyperlink causes another dialog box to be generated that contains a GUI to configure all of the parameters for the notification for the corresponding selected mode. For example, the GUI enables a list of "who receives emails" to be edited, the threshold to switch from one mode to another to be entered, etc.

The device status summary shown in the port manager summary area 250 of the dashboard 246 groups network devices and presents device counts per grouping. In the illustrated example, the port manager module 22 has deactivated two (2) devices, identified 178 devices for deactivation but failed to deactivate them (e.g., due to router access control lists or telnet connection limitations), re-activated 213 devices (which have been cleaned and verified), and has identified 8 exception devices which are not segregated from the network due to an exception (e.g., devices belonging to network administrators or other authorized users responsible for responding to a cyber-attack). This area advantageously presents to the user a summary of what has been completed to date with respect to devices on the network with possible infection.

The operational mode status summary shown in the port manager summary area 250 of the dashboard 46 summarizes alert events for two alerting modes of the port manager module 22, the security alerting mode and cyber event mode. In the security alerting mode, which is the default mode, the port manager module 22 sends an electronic mail (e-mail) message to a group of users (e.g., network administrators or other authorized users) each time a suspect IP address is received from the intrusion detection system 18. The summary shown under "Security Alerting Mode" in the dash board 46 shows the event names for which the IDS 18 has sent events to the CAM CC application 20. In some examples, port manager module 22 reacts to each event that is received from the IDS. In such examples, the IDS 18 is configured to only report certain events to the CAM CC application 20, for example, only those known events that an automatic blocking of the port prior to any human intervention is needed. The security alerting mode is used when the frequency of events is low. If the frequency of events received by the port manager module exceeds some configurable threshold (e.g., 5 events in under 5 minutes time), the port manager module 22 transitions to a cyber event mode, in which the port manager module 22 pages a larger group of network administrators or other authorized users to notify them that a probable cyber attack is underway. The summary shown under "Cyber Event Mode" in the dashboard 246 shows the events that triggered the cyber event mode. With the high frequency of reported events during cyber event mode, the email alerting to network administrators or other authorized users is changed to reporting only every hour with the device status included in the hourly email.

The dashboard 246 also summarizes the status of the filtering module 24 by listing names and a summary of traffic filters that are currently in place. In the illustrated example shown in FIG. 5A, two test traffic filters are shown, "24addremove2" and "finaltest2". The 24addremove2 filter is defined using an extended access control list (EACL) number 139. The filter blocks port 207 in Transfer Control Protocol (TCP) data, and port 207 in User Datagram Protocol (UDP) data on the network. The finaltest2 filter is defined using an extended access control list (EACL) number 140. This filter also blocks port 207 in Transfer Control Protocol (TCP) data, and port 207 in User Datagram Protocol (UDP) data on the network. As described in examples below, the filters can be applied on a regional basis, such as Bermuda routers, Boston routers, etc. In such examples, the test names "24addremove2" and "finaltest2" would be replaced with the regions in which the filters are applied.

To configure and apply filters, the user selects the "Filtering" button 236 on the command bar 232. Upon selection of or moving the cursor over the button 236, a menu appears with additional selections associated with the filtering module 24, such as add EACLs, remove EACLs, and view logs. The add EACLs and remove EACLs selection elements enable a user to add or remove, respectively, EACLs from selected portions of the network. The view logs selection element allows the user to view a log of any filtering activity performed by any other user of the CAM CC application 20.

Figure 5B:
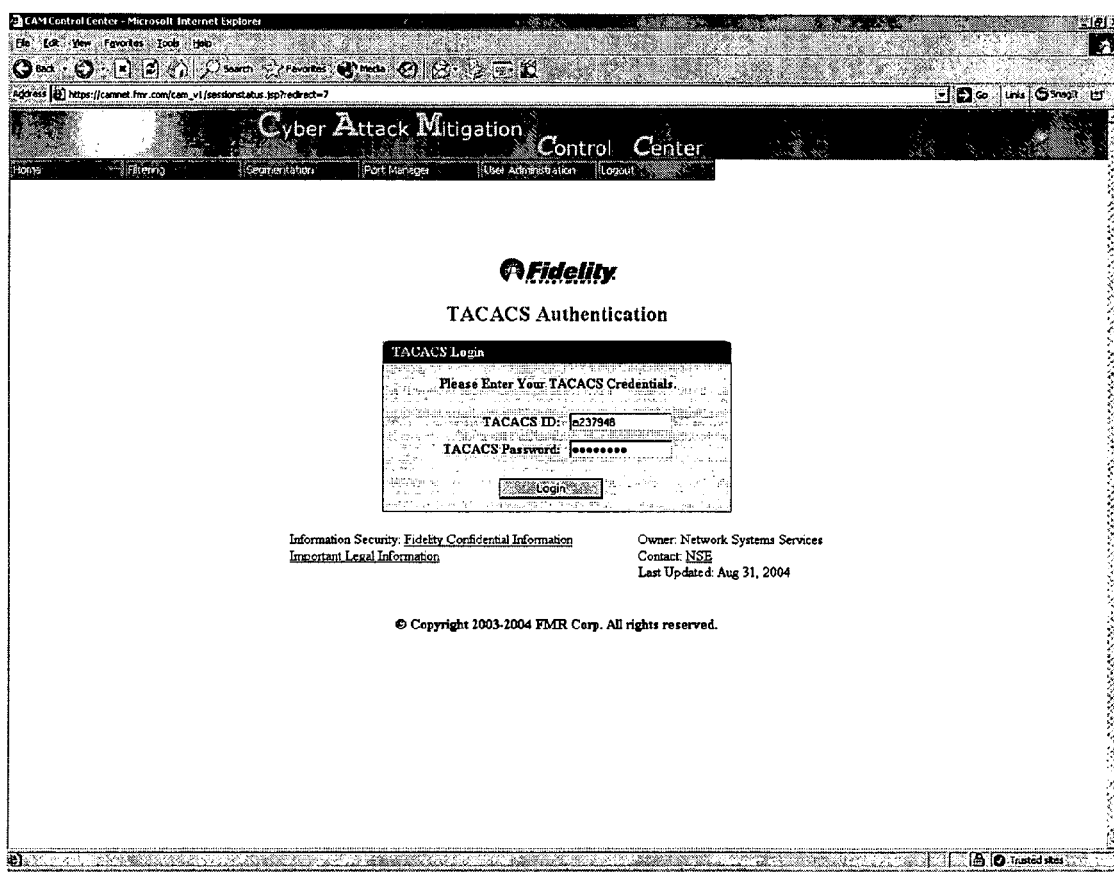

Upon selection of the add EACLs selection element, the user is presented with another graphical user interface 275, shown in FIG. 5B. This GUI 275 requires an additional authentication to proceed. Because the filtering module 24 works at the router layer, this additional authentication enables the user to apply the filtering directly to the routers after the filter is defined. The illustrated example uses a terminal access controller access control system (TACACS), which is an authentication protocol. TACACS allows a remote access server to communicate with an authentication server in order to determine if the user has access to the network. Other examples can use other remote access authentication protocols, such as extended TACACS (XTACACS), TACACS+, and remote authentication dial-in user service (RADIUS). The use of particular network equipment may require the use of a particular authentication protocol. For example, the use of routers made by Cisco Systems, Inc. of San Jose, Calif. may require use of TACACS.

Figure 5C:
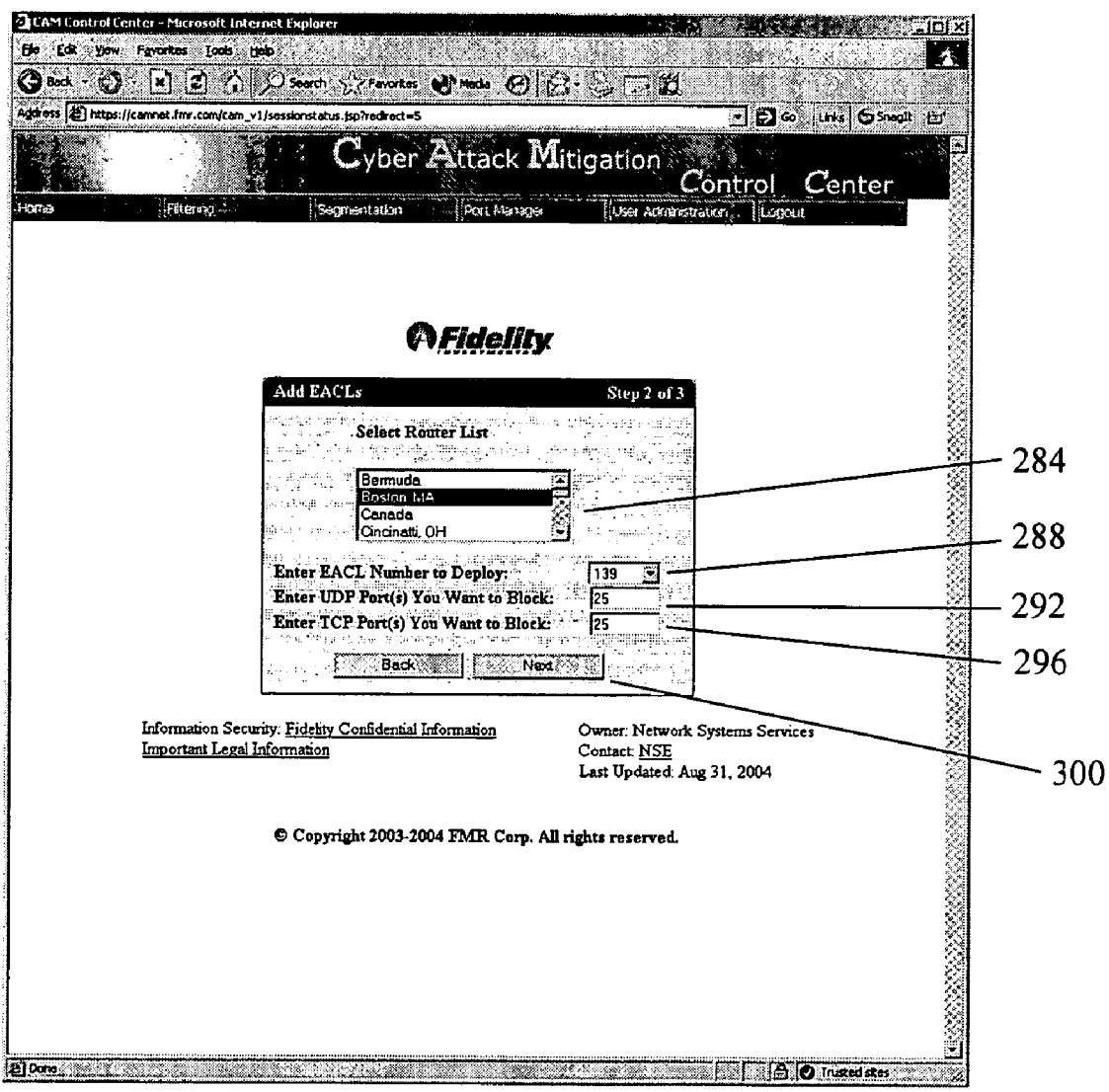

If the user credentials are accepted, then user is presented with another graphical user interface 280, shown in FIG. 5C. This GUI 280 enables the user to define the filter that is to be applied to block certain traffic on the network. The GUI 280 includes a scrolling selection box 284 that lists regions of routers in which the filter can be applied. In the illustrated example, the user has selected the Boston, Mass. region to apply to filter. The GUI 280 also includes a drop down selection box 288 that enables the user to select an EACL number to assign to the defined filter. In some examples, the numbers available to be assigned are limited. For example, the numbers can be limited to 139, 140, and 141. Because routers append a new EACL with the same number as an existing one, there is preferably more than one EACL number that a user has available. With more than one, a user can apply a filter (e.g., EACL 139) to the Boston region routers. If for some reason that doesn't work as envisioned by the user, the user can define another EACL 140 while the EACL 139 stays in place. When finished, the EACL 140 can be deployed and applied and then the EACL 139 can be removed, so there are no conflicting rules on a particular router. By preferably reserving a certain number of EACL numbers for the CAM CC application 20, an organization does not have to worry that a new EACL filter may be appended to an unrelated EACL with the same number generated by a different department.

The GUI 280 also includes a text entry box 292 that enables a user to enter one or more protocol ports (e.g., comma delimited for multiple ports) in UDP data that are to be blocked by the filter. Similarly, the GUI 280 also includes a text entry box 296 that enables a user to enter one or more protocol ports in TCP data that are to be blocked by the filter. In the illustrated example, the user is blocking port 25, which is SMTP data. When the user has completed all of the information to define the filter, the user selects the next button 300.

Figure 5D:
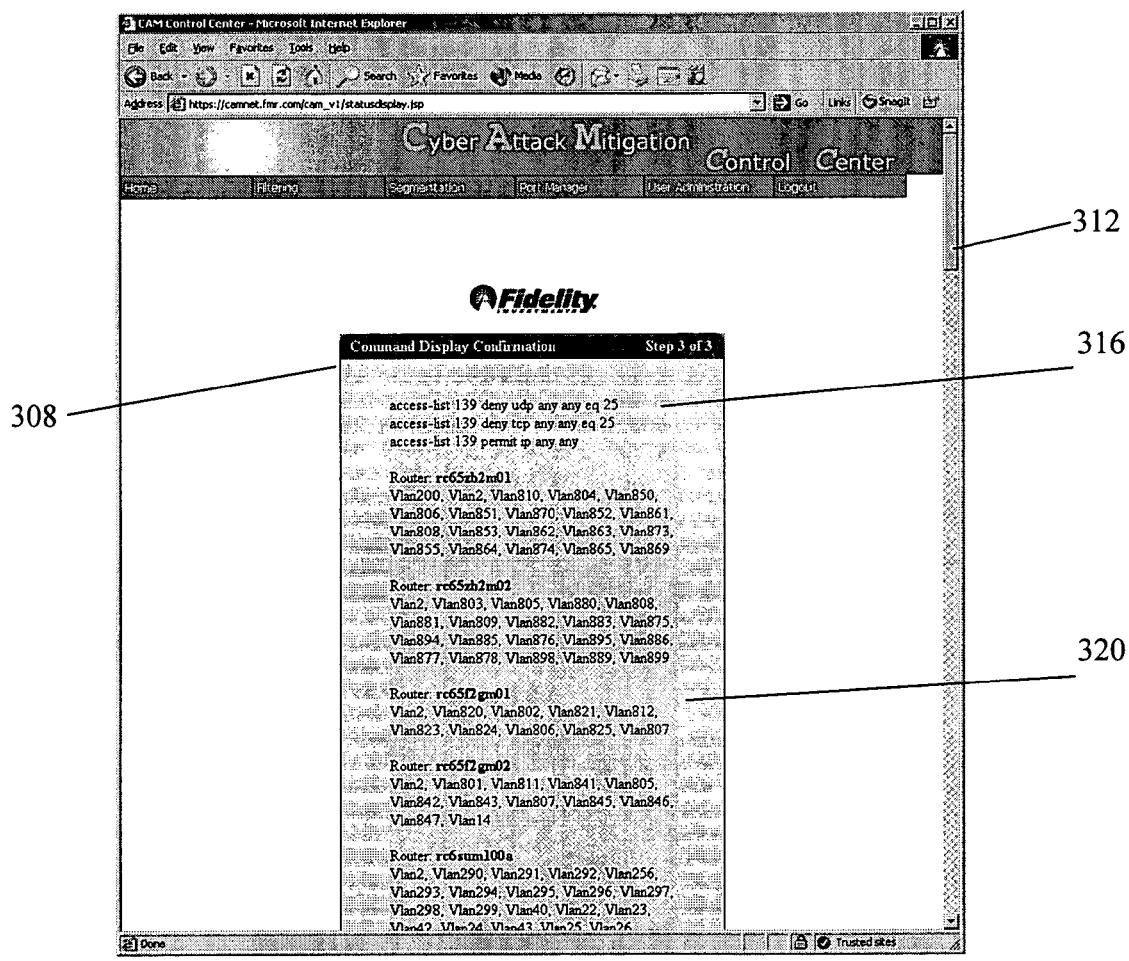
Figure 5E:
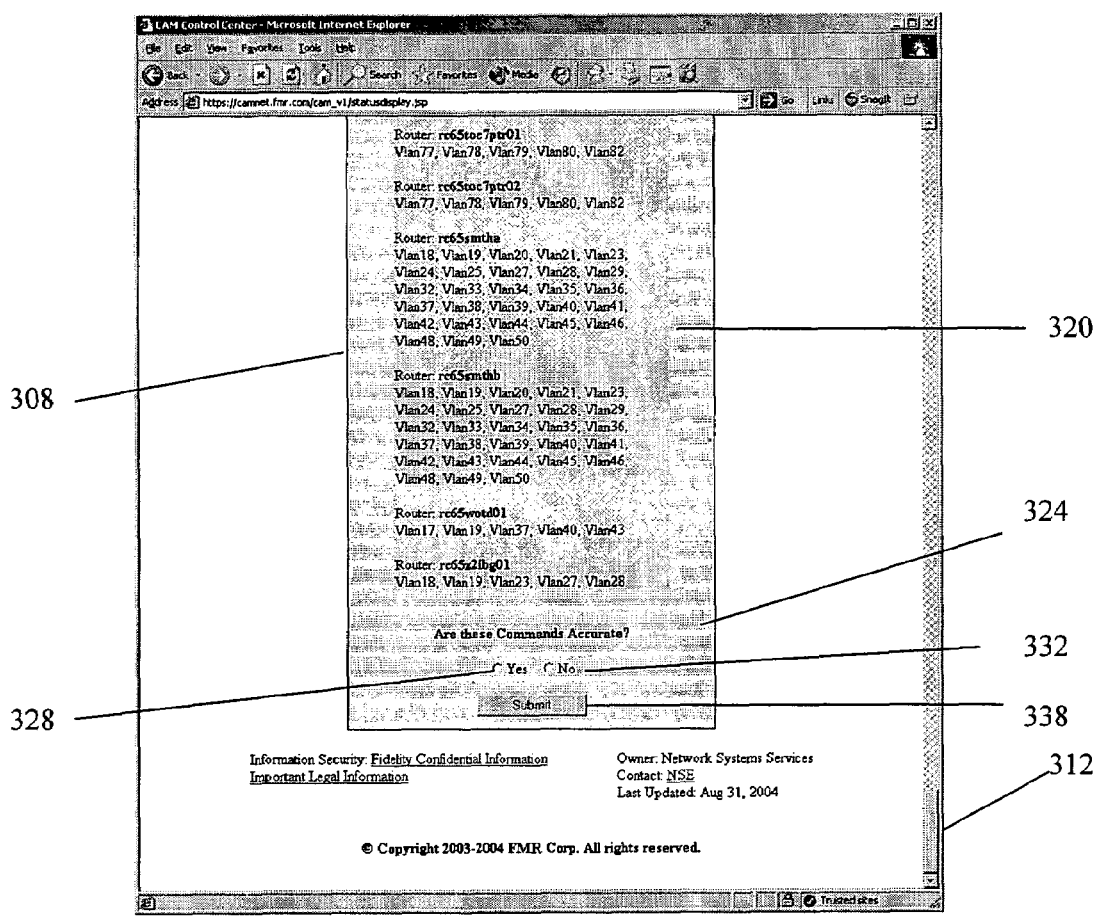

Upon selection of the next button 300, the user is presented with another graphical user interface 304, shown in FIGS. 5D and 5E. This GUI 304 includes a summary 308 of the filter defined in the previous GUI 280. Because the summary 308 is longer than the display screen, the GUI 304 also includes a scroll bar 312 to scroll among all regions of the summary 308. In a top portion 316 of the summary 308, there is a list of all of the blocked protocol ports for the filter. In a middle portion 320 of the summary 308, there is a listing of all of the applicable routers. For example, with the selection of the region Boston, Mass., the middle portion 320 lists all of the router identifiers (e.g., rc65zh2m01, rc65zh2m01, etc.) for the routers in the selected region. For each router, all the interfaces associated with that router are also listed. For example, the router rc65zh2m01 includes the interfaces Vlan200, Vlan2, Vlan810, etc.

A bottom portion 324 (FIG. 5E) of the summary 308 includes selection elements 328 and 332 to enable the user to input whether the filter is correctly defined. In this example, the user is not able to go back (e.g., use the browser "back" button) to the previous GUI 280 and instead must correct the problem by selecting the "NO" element 332 and selecting a submit button 338. Such a combination then clears the previously defined filter and allows the user to start again at GUI 280. If the filter is defined correctly in the summary 308, then the user selects the "Yes" element 328 and selects the submit button 338. The filtering module 24 then builds an EACL using some predefined scripts and the data from the summary 308. Once built, the EACL is deployed to each of the routers listed in the summary 308 (this can be done in parallel) and the EACL is applied on each of the routers. Once the EACL is successfully applied on each of the routers, the filter is added to the filter summary region 260 (FIG. 5A).

Referring back to FIG. 5A, the network segmentation module summary area 270 of the dashboard 246 summarizes the status of the segmentation module 26 by listing network segments which have been cut off from the network. In the illustrated example, one network segment named "CAMfinaltest4" has been segregated from the network. To configure and block particular segments, the user selects the "Segmentation" button 238 on the command bar 232. Upon selection of or moving the cursor over the button 238, a menu appears with additional selections associated with the segmentation module 24, such as shutdown interfaces, open interfaces, and view logs. The shutdown interfaces and open interfaces selection elements enable a user to block or open, respectively, defined interfaces of selected portions of the network. The view logs selection element allows the user to view a log of any segmentation activity performed by any other user of the CAM CC application 20.

Figure 5F:
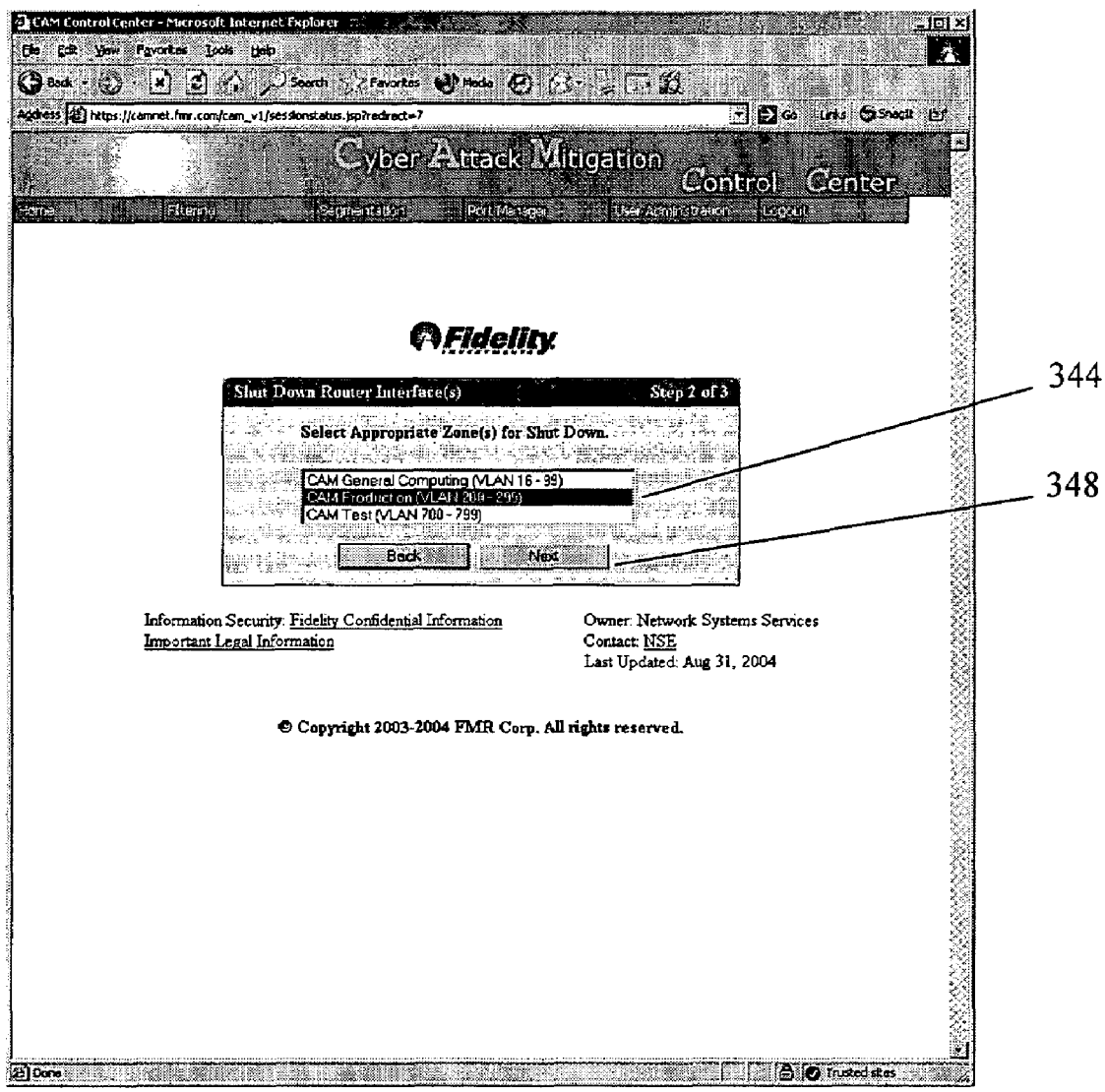

Upon selection of the shutdown interfaces selection element, the user is presented with another graphical user interface 340, shown in FIG. 5F. Like the GUI 280, this GUI 340 also requires an additional authentication (e.g., as shown in FIG. 5B) to proceed. If the user had previously performed this authentication and the time-out period is not expired, the previous authentication can be used. The GUI 340 enables the user to block a particular segment of the network that has been logically grouped together. For example, the GUI 240 includes a scrolling selection box 344 that lists the logical groupings of devices that can be block as a unit. The selection box 344 has three logical groupings that correspond to the groupings as described in Table 1. These groupings are logical because the same router may have one or more interfaces associated with each of the groupings and the devices in the groupings may be located in any geographical location, thus being dispersed anywhere in the network.

Figure 5G:
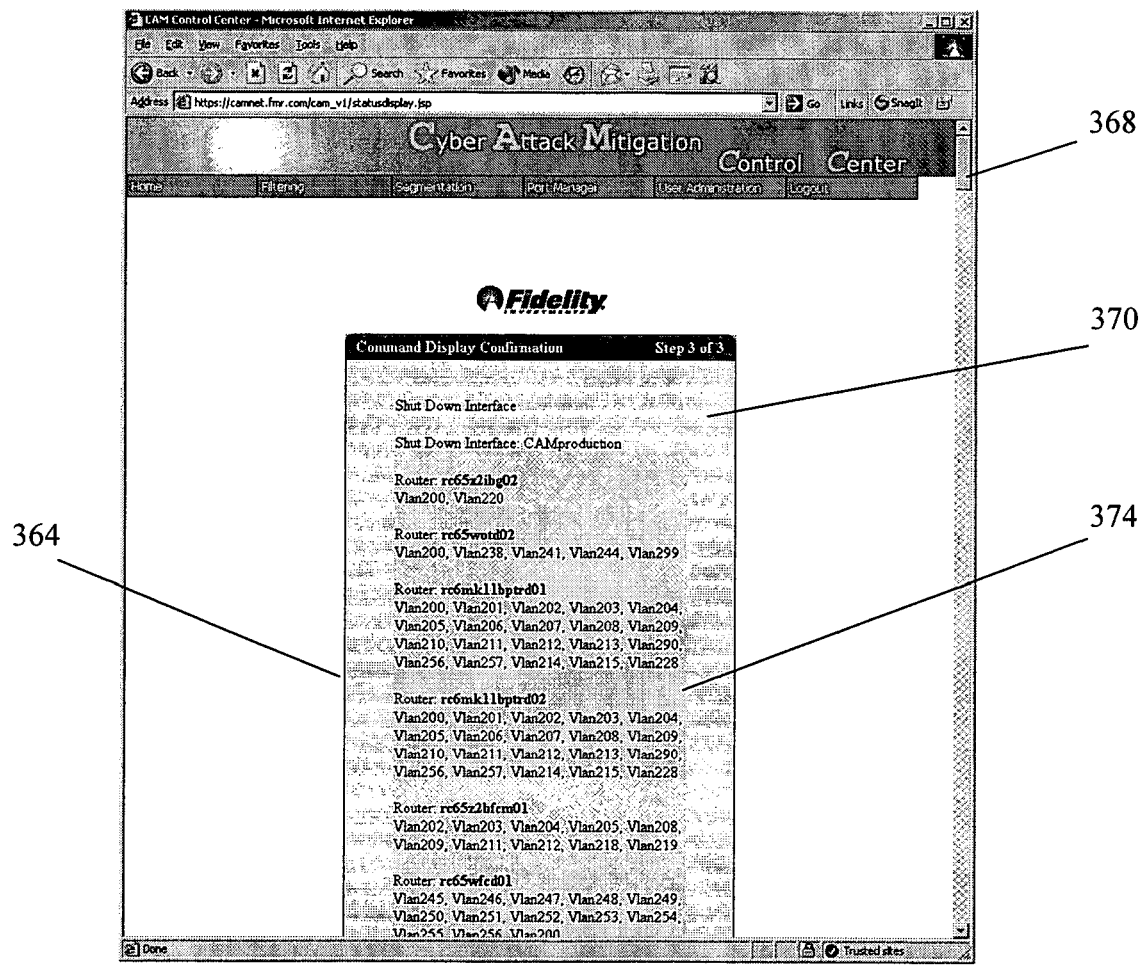
Figure 5H:
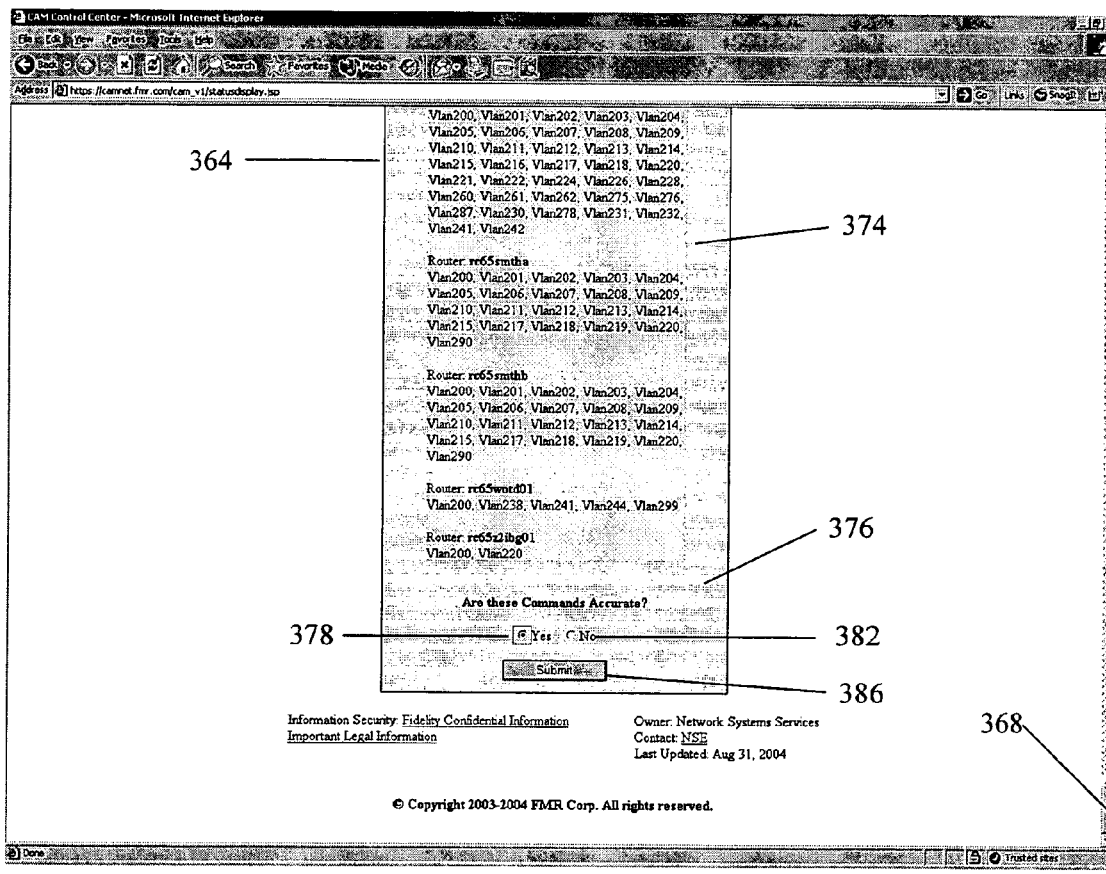

In the illustrated example, the user has selected to block the CAM Production segment, which is defined as VLANs 200-299. When the user has made the selection of the segment to block, the user selects the next button 348. Upon selection of the next button 300, the user is presented with another graphical user interface 360, shown in FIGS. 5G and 5H. This GUI 360 includes a summary 364 of the segment to be blocked, which was selected in the previous GUI 340. Because the summary 364 is longer than the display screen, the GUI 360 also includes a scroll bar 368 to scroll among all regions of the summary 364. In a top portion 370 of the summary 308, there is a list of all of the blocked segments. In the example, the blocked segment is the logical group CAM production. In a middle portion 374 of the summary 364, there is a listing of all of the applicable routers and their applicable interfaces. For example, with the selection of the logical group CAM production, the middle portion 374 lists all of the router identifiers (e.g., rc65z2ibg02, rc65wotd02, etc.) for the routers that have interfaces associated with the selected logical group CAM production. For each router, the applicable interfaces associated with the selected logical group CAM production. For example, the router rc65z2ibg02 has two applicable interfaces that are to be blocked, specifically Vlan200 and Vlan220. The router rc65wotd02 has five applicable interfaces that are to be blocked, specifically Vlan200, Vlan238, Vlan241, Vlan244, and Vlan299. As indicated above, the interfaces Vlan 200-Vlan 299 have been grouped together as the logical group CAM production, and so all of the listed interfaces fall within that defined range.

A bottom portion 376 (FIG. 5H) of the summary 364 includes selection elements 378 and 382 to enable the user to input whether the filter is correctly defined. In this example, the user is not able to go back (e.g., use the browser "back" button) to the previous GUI 340 and instead must correct the problem by selecting the "NO" element 382 and selecting a submit button 386. Such a combination then clears the previously selected segment and allows the user to start again at GUI 340. If the blocked segment is defined correctly in the summary 364, then the user selects the "Yes" element 378 and selects the submit button 386. The segmentation module 26 then sends deploys the commands to each router to block all traffic (inbound and outbound) for the physical ports associated with any of the applicable interfaces indicated in the summary 364. Once the blocking of the logical group is successfully applied on each of the routers, the block segment is added to the segmentation summary region 270 (FIG. 5A).

Once an IP address is received by the CAM CC application 20 as associated with a threat, the CAM CC application 20 tracks and changes the state of that IP address. For example, the state of the IP address can be deactivated, failed deactivation, reactivated, exception, or historical. If, for example, the IP address is received by the port manager module 22, as described above, the port manager module 22 determines the port and device associated with that IP address and shuts down all traffic to and from that device. If the port manager module 22 is not successful with the automatic shut down, the state of that device, associated with an IP address, is failed deactivation. If the port manager module 22 is successful with the automatic shut down, the state of that device, associated with an IP address, is deactivated. Once the device is cleaned and added back to the network, the state of the device becomes reactivated. Once a reactivated device is verified, then the state of the device becomes historical. In other words, the device is not actively tracked, but all transactions of that device are stored and maintained in a historical log. An authorized user can then view the previous history of any device to determine, for example, if a particular device seems problematic or highly prone to infection. An exception state is assigned to a device that is associated with an authorized user so that the excepted device is not automatically shut down, for example, even if part of a blocked segment or applied filter.

Figure 5I:
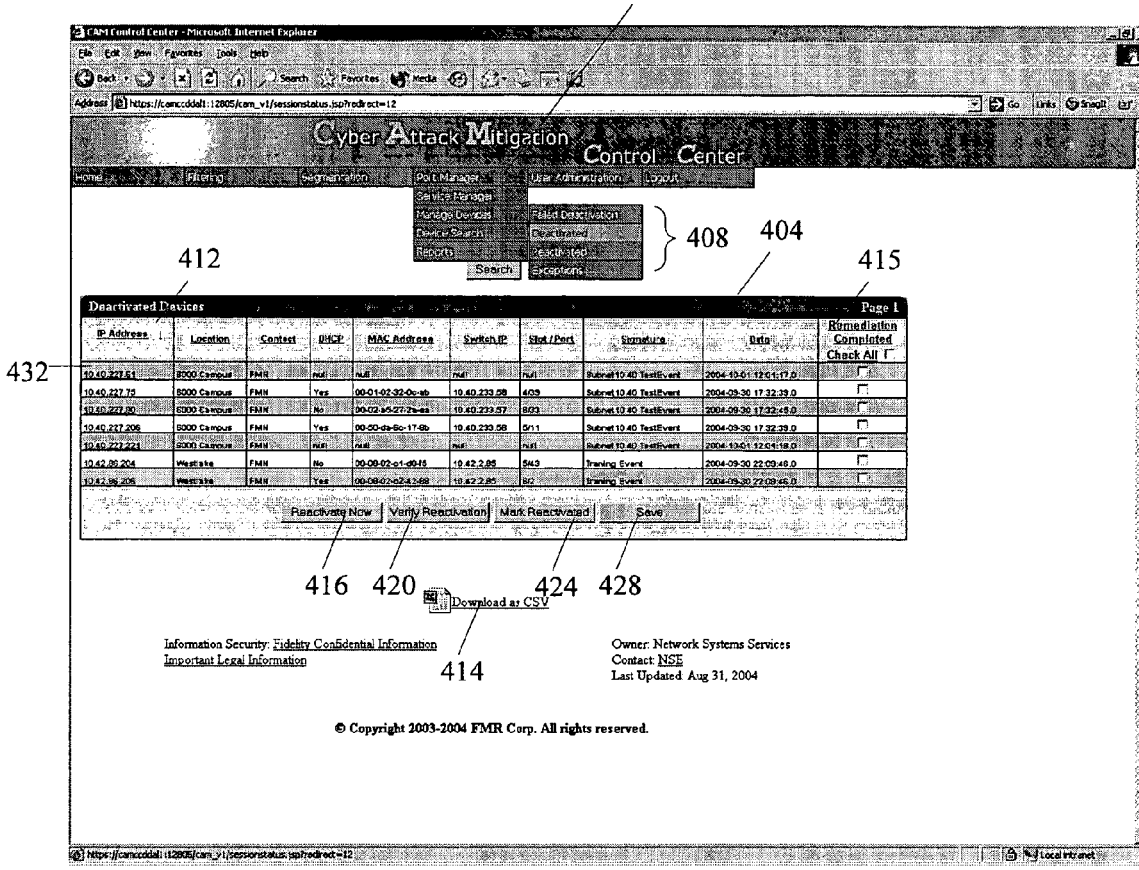

To view what devices are associated with what state, and to transfer devices from one state to another, the CAM CC application 20 generates GUIs for these purposes. FIG. 5I illustrates exemplary GUI 400, which displays a list 404 of devices that are in the deactivated state. To get to this list of deactivated devices, an authorized user can select the port manager button 240. Upon selection of or moving the cursor over the button 240, a menu appears with additional selections associated with the port manager module 22, such as service manager, manage devices, device search, and reports. Selection of or moving the cursor over the managing devices menu entry causes an additional menu 408 to appear on the side of the managing devices menu entry. The additional menu 408 includes the selections failed deactivation, deactivated, reactivated, and exception, which correspond to the states in which a device can have. In FIG. 5I, the deactivated menu item is selected, which causes the CAM CC application 20 to generate the list 404.

The list includes 10 columns with information about each device in the deactivated state. For example, the IP address, the location, the contact department, the MAC address, the switch IP address, and the slot and port associated with the device are listed. Also the threat signature associated with the device and the date the device was deactivated are listed. Whether the DHCP prevention has been activated is also listed in the DHCP column. The list can be sorted on any column. A visual indicator 412 is included in the column heading of the column by which the list is sorted. A hyperlink 414 is included in the GUI 400 that enables the user to save the list in a particular format (e.g., a spread sheet format) so that the user can print out and/or manipulate the list as necessary. Also, by clicking on the IP address, the CAM CC application 20 displays all of the history for that IP address.

Although FIG. 5I illustrates the list 404 for deactivated devices, a similar list can be generated for failed deactivation devices, reactivated devices, exceptions devices, and historical logs. The lists for any of these states can include the same columns that are included in the list 404. An authorized user can navigate to any of these other lists using the menu 408. The CAM CC application 20 also enables an authorized user to perform a more directed search to find a device using a search dialogue box (not shown). The search dialogue box includes two drop down menus. The first drop down box includes the states that correspond to each of the lists, so that the user can search a particular state. The second drop down box includes a list of the columns available. The user can then enter specific data (e.g., a value) corresponding to the selected column and the CAM CC application 20 generates a list in response to the search criteria. The user can also enter partial data for selected search fields (e.g., a portion of the IP address or the MAC address) as a search criterion.

The GUI 400 is not only used for displaying the list 404. The GUI 400 is also used to change the state of one or more devices. The checkboxes in column 415 enable a user to select one or more devices to which the change of state is applied. Buttons 416, 420, 424, and 428 enable a user to change the state. The button 416 causes the CAM CC application 20 to automatically reactivate all selected (i.e., box checked in column 415) devices. In automatic reactivation, the CAM CC application 20 unblocks the port associated with the IP address and allows the MAC to obtain DHCP assigned IP addresses. Before the automatic reactivation is initiated, the CAM CC application 20 generates GUI 500 illustrated in FIG. 5J. This GUI is a checklist that the user must go through before the automatic reactivation can take place. The user reviews the checklist of GUI 500 and checks the check box if that item is complete. If all 5 items of the check list are complete, the user can press a submit button 504 and the CAM CC application 20 initiates the automatic reactivation. If the user presses the submit button 504 without first checking all of the boxes of the checklist, then the CAM CC application 20 generates an error message stating that the user cannot continue without first checking all of the boxes in the checklist.

Referring back to FIG. 5I, the button 420 allows a user to perform a system verification that a selected device has been reactivated. This is used, for example, when the device is reactivated manually (e.g., an authorized user has reactivated the port by logging on directly to the switch). When the user selects the button 420 the CAM CC application 20 attempts to communicate with the selected device(s) to determine if the device is communicating with the network. Upon successful verification, the device state is changed to reactivated. If the verification fails, the device state remains deactivated.

The button 424 enables a user to change the selected device(s) to a reactivated state without verification. This is used, for example, when there are nulls in the values used to automatically locate a device, for example in row 432. Use of the button 424 changes the state of the device from deactivated to reactivated without any further verification. Because there is no verification, the CAM CC application 20 requires the user selecting the button 424 to enter his or her user identification for authorization of the state change. The button 428 saves the states of the GUI 400 so that the user can close the page and come back to that state at a later time or at another device.

Figure 5K:
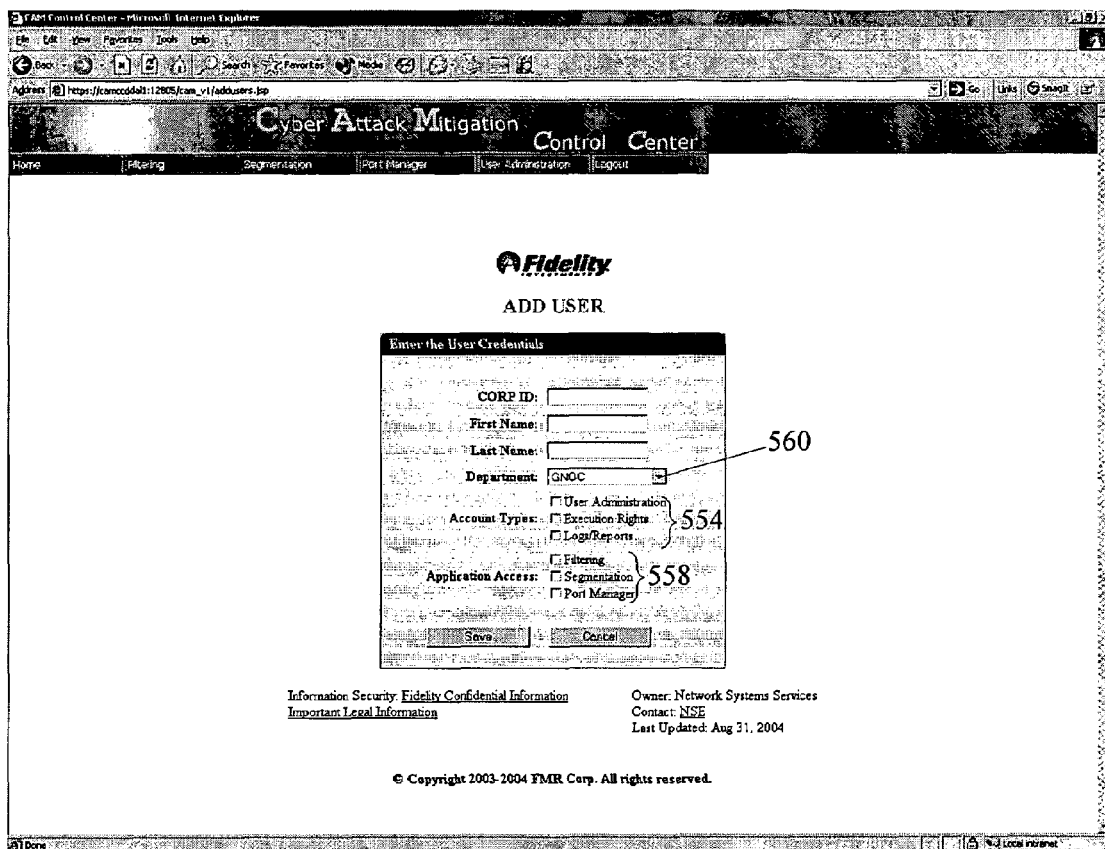

FIG. 5K illustrates a GUI 550 used to add or modify an authorized user for the CAM CC application 20. The GUI 550 includes selection area 554 and 558 to enable an added user to be associated with one or more account types and access to one or more of the modules 22, 24, and/or 26. The GUI 550 also includes a drop down menu 560 that includes a list of departments with which the added user is associated. For example, the departments can include global network operations center (GNOC), advanced network support (ANS), information security, regional support, and network, system, and services (NSS).

In some examples, each of these departments has a different role. The department can be used as another differentiator to access certain features or GUIs of the CAM CC application 20. For example, GNOC can be responsible for any devices in the failed deactivation state. For any device in that state, the GNOC user attempts to deactivate the device. Once deactivation is completed, the GNOC user changes the state of that device from failed deactivation to deactivated. An ANS user can also be responsible for trying to deactivate devices in the failed deactivation state. The ANS user can also be responsible for handling the exception devices.

The regional support user views the deactivated list (e.g., list 404) and is responsible for applying any patches and performing any of the other actions required by a checklist (e.g., the GUI 500), and changing the state from deactivated to reactivated. There can be different regional users responsible for different regions. For example, in the list 404 (FIG. 5I), there are five devices associated with the location 6000 campus and two devices associated with the location Westlake. One regional support user can be assigned to the location 6000 campus and another regional support user assigned to the location Westlake.

The information security user can be responsible for devices that are reactivated. The information security user can scan the reactivated devices using a threat detection scan product (e.g., manufactured by Foundstone, Inc.) to determine if the reactivated device is completely clean and all necessary patches are installed. If the device fails the scan, the information security staff can then mark the device as having failed scan by clicking on a button. This marks the device for auto-deactivation, and the CAM CC application 20 processes the device again as if it appeared into the system anew. Upon determination that the device is completely clean, the information security user can change the state of the device from reactivated to historical. In other words, the device is no longer tracked, but stored and maintained in a historical log for future reference. Distributing the responsibility of changing the state of the infected devices advantageously allows an enterprise to use the CAM CC application 20 to efficiently, quickly, and systematically deal with a cyber attack.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Nevertheless, it will be understood that various modifications may be made without departing from the spirit and scope of the invention. The alternatives described herein are examples for illustration only and not to limit the alternatives in any way. The steps of the invention can be performed in a different order and still achieve desirable results. Accordingly, other embodiments are within the scope of the following claims.

What is claimed is:

1. A computer-implemented method for mitigating against a cyber attack on a network, the method comprising:
receiving an IP address of an infected device and a signature identifier from an intrusion detection system at a cyber attack mitigation control center in response to the intrusion detection system detecting an event that represents a threat to the network at one or more locations on the network, wherein the intrusion detection system checks data packets travelling through the network against a predefined signature;
locating, by the cyber attack mitigation control center, a physical port associated with the threat in response to receiving the IP address by:
a) querying, by the cyber attack mitigation control center, an address table corresponding to a first router or a first switch to determine a port associated with the IP address on the router or the switch,
b) if the port associated with the IP address is not connected to the infected device, navigating to a second router or to a second switch connected to the port associated with the IP address of the first router or to the first switch, and
c) navigating to additional routers and/or switches by repeating a) and b) until the physical port associated with the infected device is located; and
automatically shutting off the physical port associated with the infected device.

2. The method of claim 1 further comprising identifying a physical address of the network device using the locating steps.

3. The method of claim 2 wherein the physical address comprises a media access control address.

4. The method of claim 2 further comprising preventing the network from assigning another logical address to any device having the identified physical address.

5. The method of claim 4 where preventing further comprises employing DHCP to prevent the network from assigning another logical address to any device having the identified physical address.

6. The method of claim 1 further comprising preventing the infected device from reconnecting to the network.

7. The method of claim 1 wherein the address table comprises one or more routing tables maintained by routers in the network.

8. The method of claim 1 further comprising periodically querying one or more routers of the network to build a list of active interfaces on each router or the logical ports corresponding to each active interface.

9. The method of claim 1 further comprising automatically transmitting an electronic notification of the received event to a predefined list of users.

10. The method of claim 9 further comprising automatically changing a frequency of notification when a predefined number of events are received within a predefined period of time.

11. The method of claim 1 further comprising re-enabling the physical port after a device associated with the threat has been cleaned.

12. The method of claim 1 wherein navigating to the physical port occurs without a network map.

13. The method of claim 1 wherein automatically shutting off the physical port occurs without the use of a filter.

14. The method of claim 1 wherein locating comprises employing CDP protocol.

15. The method of claim 1 further comprising:
scanning a device to determine if all necessary patches have been installed; and
automatically shutting off the physical port associated with the scanned device if it is determined that all of the necessary patches have not been installed.

16. The method of claim 15 wherein the scanned device is a device that has been reactivated.

17. The method of claim 1 further comprising displaying an element in a graphical user interface associated with the cyber attack mitigation control center, the element being configured to receive user input to select from a set of states comprising an inactive state, an active state, or both, wherein the active state includes automatically detecting and shutting down the physical port associate with the infected device indentified in the received information and the inactive state includes not automatically reacting to received information.

18. The method of claim 1 wherein receiving comprises downloading as a CSV file.

19. A system for mitigating against a cyber attack on a network, the system comprising:
a communications network; and
a computing device in communication with the communications network, the computing device being configured to:
receive an IP address of an infected device and a signature identifier from an intrusion detection system at a cyber attack mitigation control center in response to the intrusion detection system detecting an event that represents a threat to the network at one or more locations on the network, wherein the intrusion detection system checks data packets travelling through the network against a predefined signature;
locate, by the cyber attack mitigation control center, a physical port associated with the threat in response to receiving the IP address by:
a) querying, by the cyber attack mitigation control center, an address table corresponding to a first router or a first switch to determine a port associated with the IP address on the router or the switch,
b) if the port associated with the IP address is not connected to the infected device, navigating to a second router or to a second switch connected to the port associated with the IP address of the first router or to the first switch, and
c) navigating to additional routers and/or switches by repeating a) and b) until the physical port associated with the infected device is located; and
automatically shut off the physical port associated with the infected device.

20. The system of claim 19 wherein the computing device further comprises a segmentation module configured to automatically block a plurality of ports associated with a logical segment of the network.

21. The system of claim 20 wherein the logical segment of the network comprises a segment associated with enterprise functionality.

22. The system of claim 20 wherein the logical segment of the network comprises a segment associated with production, testing, or general computing.

23. The system of claim 19, further comprising:
a interface generation module configured to generate a graphical user interface to associate a user with a port management module, a filtering module, a segmentation module, or any combination thereof.

24. A computer program product, tangibly embodied in a computer-readable storage medium, for mitigating against a cyber attack on a network, the computer program product including instructions being operable to cause data processing apparatus to:
receive an IP address of an infected device and a signature identifier from an intrusion detection system at a cyber attack mitigation control center in response to the intrusion detection system detecting an event that represents a threat to the network at one or more locations on the network, wherein the intrusion detection system checks data packets travelling through the network against a predefined signature;
locate, by the cyber attack mitigation control center, a physical port associated with the threat in response to receiving the IP address by:
a) querying, by the cyber attack mitigation control center, an address table corresponding to a first router or a first switch to determine a port associated with the IP address on the router or the switch,
b) if the port associated with the IP address is not connected to the infected device, navigating to a second router or to a second switch connected to the port associated with the IP address of the first router or to the first switch, and
c) navigating to additional routers and/or switches by repeating a) and b) until the physical port associated with the infected device is located; and
automatically shut down the physical port associated with the infected device.

25. A computer-implemented method for mitigating against a cyber attack on a network, the method comprising:
receiving an IP address of an infected device and a signature identifier from an intrusion detection system at a cyber attack mitigation control center in response to the intrusion detection system detecting an event that represents a threat to the network at one or more locations on the network, wherein the intrusion detection system checks data packets travelling through the network against a predefined signature;
locating, by the cyber attack mitigation control center, a physical port associated with the threat in response to receiving the IP address by:
a) querying, by the cyber attack mitigation control center, an address table corresponding to a first router or a first switch to determine a port associated with the IP address on the router or the switch,
b) if the port associated with the IP address is not connected to the infected device, navigating to a second router or to a second switch connected to the port associated with the IP address of the first router or to the first switch, and
c) navigating to additional routers and/or switches by repeating a) and b) until the physical port associated with the infected device is located; and
automatically blocking the physical port.

26. The method of claim 25 wherein automatically blocking the physical port further comprises employing an extended access control list.

27. The method of claim 26 wherein automatically blocking further comprises applying the extended access control list to one or more routers associated with a region selected by a user.

28. The method of claim 25 wherein locating comprises determining a logical grouping of interfaces associated with a segment of the network.

29. The method of claim 28 wherein automatically blocking comprises blocking each physical port associated with a device included in the logical grouping.

30. The method of claim 25 comprising blocking one or more protocol ports in response to receiving the IP address, wherein the protocol port is a Hypertext Transfer Protocol port, a Transmission Control Protocol port, a User Datagram Protocol port, a Hypertext Transfer Protocol Secure port, or any combination thereof.

* * * * *